United States Patent

[11] 3,569,844

[72] Inventor Robert E. Lynn
Somerville, N.J.
[21] Appl. No. 714,208
[22] Filed Mar. 19, 1968
[45] Patented Mar. 9, 1971
[73] Assignee Hewlett-Packard Company
Palo Alto, Calif.

[54] SYNC STRIPPER
11 Claims, 6 Drawing Figs.

[52] U.S. Cl. 328/151, 307/232, 307/235, 328/149, 328/151, 330/30
[51] Int. Cl. H03k 5/00, H03k 5/20
[50] Field of Search 328/146, 147, 148, 149, 139, 151; 330/30 (D), 69; 307/235, 232

[56] References Cited

UNITED STATES PATENTS 3,070,750 12/1962 Farber 328/149
3,423,628 1/1969 Best 328/147
3,436,560 4/1969 Marchais 307/235

*Primary Examiner*—Donald D. Forrer
*Assistant Examiner*—David M. Carter
*Attorney*—Roland I. Griffin

ABSTRACT: A video amplifier supplies an input composite video signal to the intensity control electrode of a cathode ray tube and through a low-pass filter to a differential amplifier. The sync tips of the filtered composite video signal are clamped to a fixed level in the output circuit of the differential amplifier by a closed loop feedback circuit. A diode connected in the output circuit of the differential amplifier limits the magnitude of the clamped composite video signal. This diode and a voltage divider connected to the input circuit of the differential amplifier increase the range of composite video signals that can be clamped to the fixed level. The picture signal is stripped from the clamped composite video signal by a clipping circuit. A sync separator separates the vertical field and horizontal line sync pulses from the stripped composite video signal and supplies them to vertical and horizontal deflection systems for controlling the vertical field and horizontal line scans of the electron beam of the cathode ray tube.

INVENTOR
ROBERT E. LYNN
BY *Roland I. Griffin*

ATTORNEY

INVENTOR
ROBERT E. LYNN
BY Roland I. Griffin
ATTORNEY

SYNC STRIPPER

BACKGROUND AND SUMMARY OF THE INVENTION

This invention relates to a leveling and limiting circuit for clamping the tips of a pulse train to a fixed level and, more particularly, to a sync stripper for use in a television monitor or the like to clamp the sync tips of a composite video signal to a fixed level and to strip the picture signal from the clamped composite video signal.

The composite video signal supplied to a television receiver may vary nonperiodically in amplitude due to noise or faulty transmission. It is the principal object of this invention to provide an improved sync stripper for stripping the picture signals from such composite video signals. Another object of this invention is to provide an improved voltage leveling and limiting circuit for clamping the sync tips of a wide range of such composite video signals to a fixed level to facilitate stripping of their picture signals.

These objects are accomplished according to the illustrated embodiment of this invention by passing the composite video signal through a low-pass filter to one input of a differential amplifier. A closed loop feedback circuit is activated at the horizontal line rate to sample the filtered composite video signal produced in he output circuit of the differential amplifier and to supply a correction signal proportional to the average value of the samples to the other input of the differential amplifier. This clamps the sync tips of the composite video signal produced in the output circuit of the differential amplifier to a fixed level. A diode is connected in the output circuit of the differential amplifier to limit the magnitude of the clamped composite video signal. This diode and a voltage divider connected to the input circuit of the differential amplifier increase the range of composite video signals that may be clamped to the fixed level. The picture signal is stripped from the clamped composite video signal by a clipping circuit connected to the output circuit of the differential amplifier.

Other and incidental objects of this invention will be apparent from a reading of this specification and an inspection of the accompanying drawings in which:

FIG. 1 is a simplified schematic diagram of a television receiver including a sync stripper according to the preferred embodiment of this invention; and FIGS. 2(*a*)—(*e*) are diagrams of the waveforms appearing in the receiver of FIG. 1 at the points where the letters of the waveforms are reproduced.

DESCRIPTION OF THE PREFERRED EMBODIMENT

Figure 1:
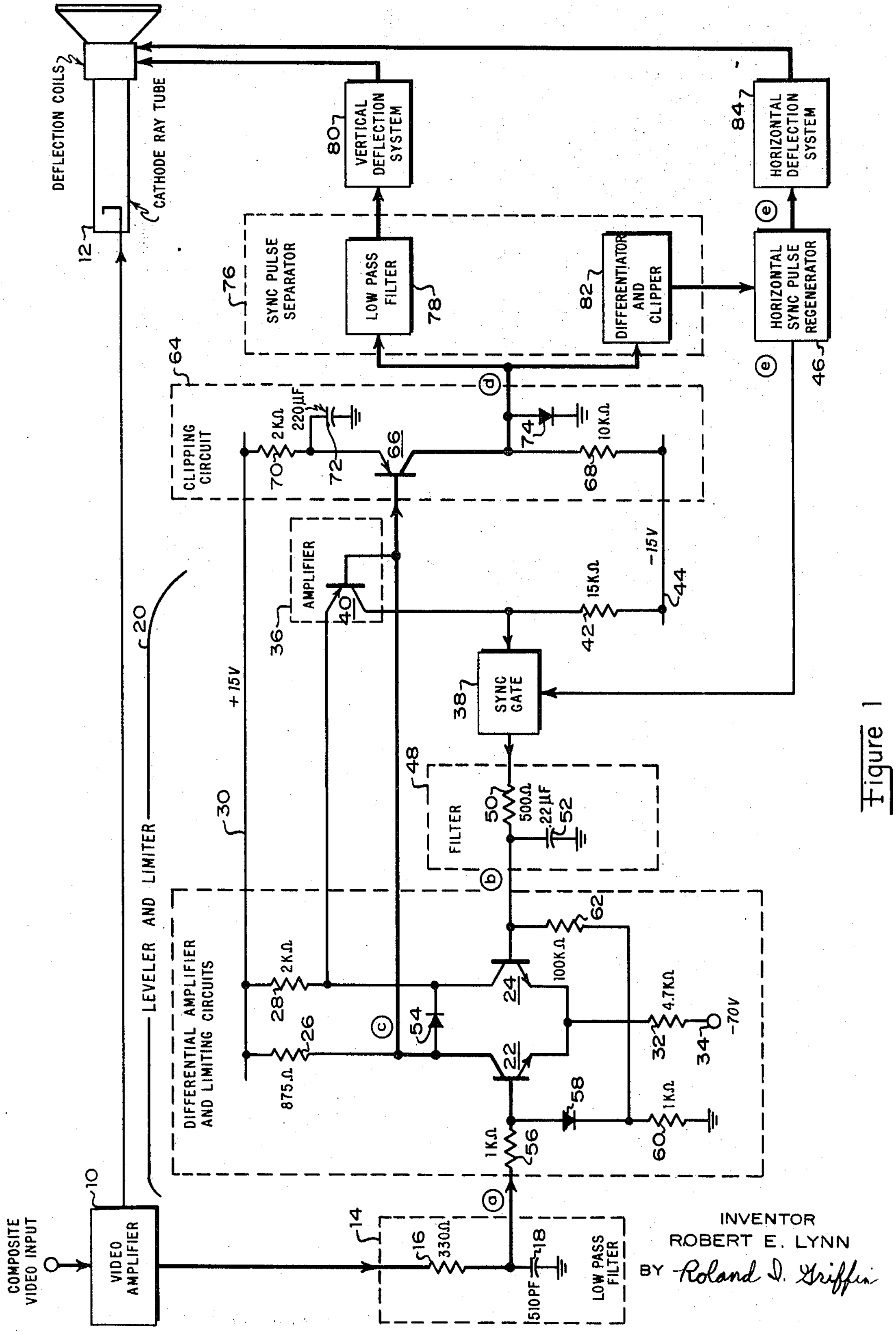
Figure 2A:
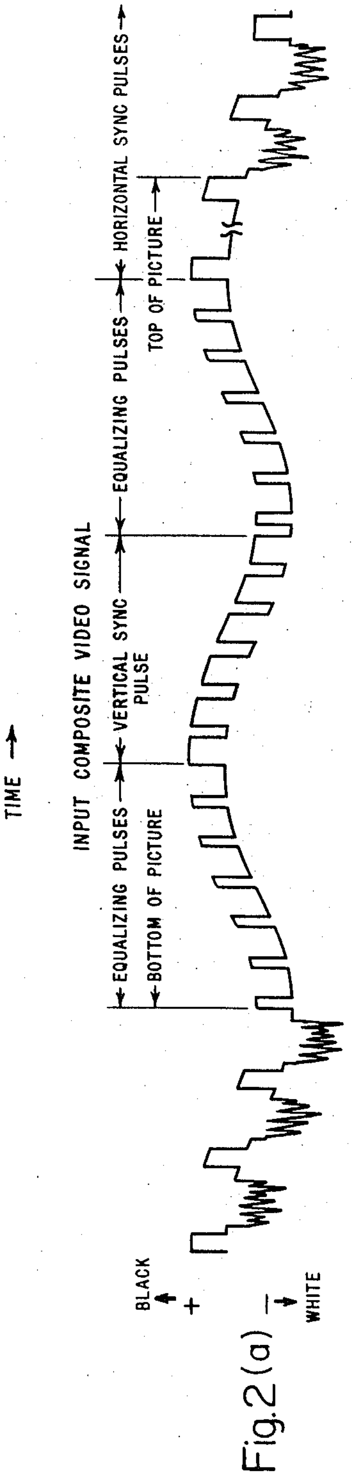
Figure 2B:
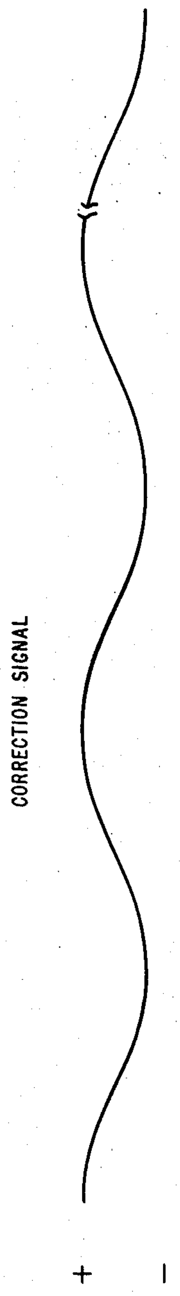
Figure 2C:
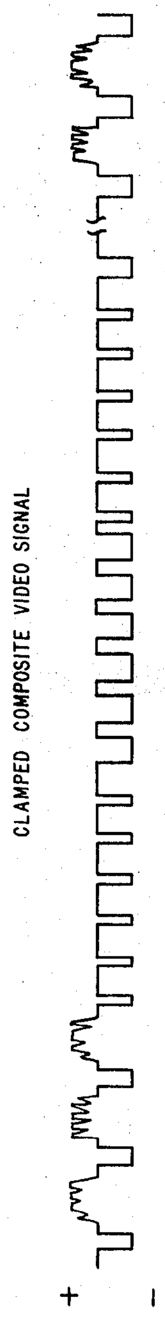
Figure 2D:
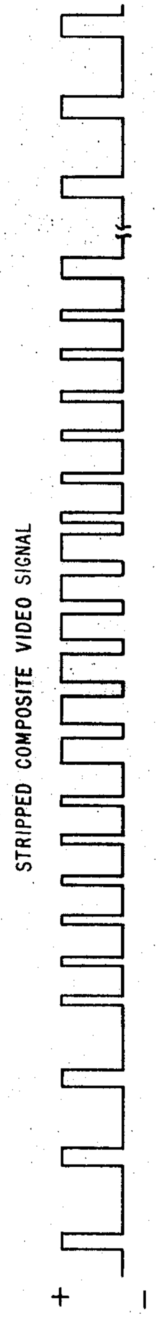
Figure 2E:
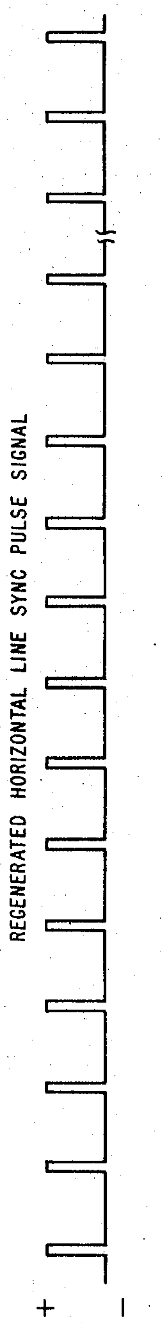

Referring now to FIG. 1, there is shown a video amplifier 10 connected for supplying an input composite video signal to the cathode electrode of a cathode ray tube 12 to control the intensity of the electron beam of the cathode ray tube. Video amplifier 10 is also connected for supplying the input composite video signal to a low-pass filter 14 having a cutoff frequency of about 500 kilohertz and comprising, for example, a series resistor 16 and a capacitor 18 shunted to ground. A vertical synchronizing interval of a filtered composite video signal such as might be obtained from low-pass filter 14 is shown in FIG. 2(*a*). The nonperiodic amplitude variations of this signal are due to noisy or faulty transmission of the input composite video signal supplied to video amplifier 10.

A leveling and limiting circuit 20 is connected for clamping the sync tips of the filtered composite video signal to a fixed level. Leveling and limiting circuit 20 includes a differential amplifier comprising, for example, NPN transistors 22 and 24 having their collectors connected by separate load resistors 26 and 28 to a source 30 of positive supply voltage and having their emitters connected in common and by a single bias resistor 32 to a source 34 of negative supply voltage. The base of transistor 22 is connected for receiving the filtered composite video signal from low-pass filter 14. In response to the filtered composite video signal, transistor 22 produces an inverted composite video signal at its collector.

Leveling and limiting circuit 20 also includes a closed loop feedback circuit for sampling the horizontal timing sync tips of the composite video signal produced in the collector circuits of the differential amplifier and for supplying a correction signal proportional to the average value of the samples to the base of transistor 24. An amplifier 36 of this feedback circuit is connected for amplifying the difference between the signals produced at the collectors of transistors 22 and 24 and producing a composite video signal inverted from that appearing at the collector of transistor 22 and for supplying the resultant signal to the signal input of a gate 38. Amplifier 36 may comprise a PNP transistor 40 having its base connected to the collector of transistor 22, having its emitter connected to the collector of transistor 24, and having its collector connected to the signal input of gate 38 and connected by a load resistor 42 to another source 44 of negative supply voltage. A regenerated horizontal sync pulse signal from horizontal sync pulse regenerator 46 is supplied to the control input of gate 38. The output of gate 38 is connected to a filter 48 comprising a series resistor 50 and a capacitor 52 shunted to ground. Gate 38 may comprise, for example, a diode bridge or field effect transistor that is periodically activated at the horizontal line rate by the regenerated horizontal sync pulse signal to sample the composite video signal from amplifier 36 and supply filter 48 with current proportional to the amplitude of the samples taken. This current charges or discharges capacitor 52 during each sampling period to develop a correction signal proportional to the average amplitude of the samples taken. Such a correction signal is shown in FIG. 2(*b*). Filter 48 is connected for supplying this correction signal to the base of transistor 24. The resultant conduction of transistor 24 alters the conduction of transistor 22 to clamp the sync tips of the composite video signal at the collector of transistor 22 to a fixed level.

Leveling and limiting circuit 20 further includes a diode 54 connected between the collectors of transistors 22 and 24. Diode 54 is poled to conduct if the picture portion of the clamped composite video signal produced at the collector of transistor 22 becomes highly positive. This limits the magnitude of the clamped composite video signal and for large input signals strips some or all of the picture signal from the clamped composite video signal. A clamped composite video signal having some of its picture signal stripped by the limiting action of diode 54 is shown in FIG. 2(*c*). Diode 54 also prevents transistor 24 from saturating and possibly affecting the charge on capacitor 52 in the base circuit of transistor 24.

Leveling and limiting circuit 20 may still further include a voltage divider comprising a resistor 56 serially connected between low-pass filter 14 and the base of transistor 22 and further comprising a diode 58 and a resistor 60 serially connected between the base of transistor 22 and ground. A bias resistor 62 connects the base of transistor 24 to a point between diode 58 and resistor 60 of the voltage divider. Diode 58 is poled to conduct for large composite video signals from low-pass filter 14 so that voltage divider resistors 56 and 60 reduce the effective voltage applied to the base of transistor 22. The voltage divider, the closed loop feedback circuit, and diode 54 therefore all combine to increase the range of composite video signals leveling and limiting circuit 20 can clamp to a fixed level. This increased range includes composite video signals varying in amplitude from about 0.4 volt to about 8 volts.

A floating clipping circuit 64 is connected for stripping the picture signal from the clamped composite video signal. Clipping circuit 64 may comprise a PNP transistor 66 having its base connected to the collector of transistor 22, having its collector connected by a load resistor 68 to the source 44 of negative supply voltage, and having its emitter connected by a bias resistor 70 to the source 30 of positive supply voltage and by a large capacitor 72 to ground. Transistor 66 conducts only during the negative-going sync tips of the clamped composite video signal from the collector of transistor 22. Resistor 70 and capacitor 72 maintain a positive bias voltage at the emitter of transistor 66 holding it at cutoff during the more positive portions of the clamped composite video signal. Transistor 66 therefore strips the picture signal from the clamped composite video signal leaving only the sync tips of the composite synchronizing signal as shown in FIG. 2(*d*). A diode 74 is connected between the collector of transistor 66 and ground to clamp the sync tips of the composite synchronizing signal to a fixed level near ground and to prevent transistor 66 from saturating.

The composite synchronizing signal from he collector of transistor 66 is supplied to a sync pulse separator 76. For waveshaping purposes it may be desirable to connect a composite synchronizing signal regenerator such as a Schmitt trigger (not shown) between the collector of transistor 66 and sync pulse separator 76. Sync pulse separator 76 includes a low-pass filter 78 for separating the vertical field sync pulses from the composite synchronizing signal and for supplying them to a vertical deflection system 80. Vertical deflection system 80 is connected to the vertical magnetic deflection coils of cathode ray tube 12 and is responsive to the vertical field sync pulses for controlling the vertical field scans of the electron beam of the cathode ray tube.

Sync pulse separator 76 further includes a differentiating and clipping circuit 82 for producihg a train of impulses from the negative-going leading edges of each horizontal line sync pulse, equalizing pulse, and vertical field sync pulse section of the composite synchronizing signal. A horizontal sync pulse regenerator 46 is connected for regenerating the horizontal timing impulses from differentiating and clipping circuit 82. Horizontal sync pulse regenerator 46 may comprise, for example, a blocking oscillator or multivibrator having its delay time adjusted so that it may be triggered at the horizontal line rate but not at twice that rate by the train of impulses from differentiating and clipping circuit 82. Horizontal sync pulse regenerator 46 is therefore triggered by the impulses derived from the horizontal line sync pulses and every other double frequency equalizing pulse and vertical field sync pulse section. However, in order to insure that horizontal sync pulse regenerator 46 is properly triggered in the presence of noise or faulty transmission a pulse inhibit circuit (not shown) of the type shown and described in my copending patent application entitled PULSE INHIBIT CIRCUIT and filed on or about Mar. 18, 1968, may be connected between differentiating and clipping circuit 82 and horizontal sync pulse regenerator 46. This pulse inhibit circuit eliminates the double frequency impulses that do not provide horizontal timing information from the impulse train supplied by differentiating and clipping circuit 82. Horizontal sync pulse regenerator 46 therefore produces a regenerated horizontal sync pulse signal such as that shown in FIG. 2(*e*). This regenerated horizontal sync pulse signal (or the complement thereof) is supplied to a horizontal deflection system 84. Horizontal deflection system 84 is connected to the horizontal magnetic deflection coils of cathode ray tube 12 and is responsive to the regenerated horizontal sync pulse train for controlling the horizontal line scans of the electron beam of the cathode ray tube.

Horizontal sync pulse regenerator 46 is also connected for supplying the regenerated horizontal sync pulse train to the control input of gate 38 as mentioned above. Since the regenerated horizontal sync pulse train is produced in phase with and at the rate of the horizontal timing sync tips of the composite video signal at the collector of transistor 22, gate 38 is activated at the horizontal line rate to sample the horizontal timing sync tips of the composite video signal at the collector of transistor 40. The closed loop feedback circuit of leveling and limiting circuit 20 therefore supplies the base of transistor 24 with a voltage proportional to the amplitude of each horizontal timing sync tip of the composite video signal at the collector of transistor 22. This clamps the horizontal timing sync tips of the composite video signal at the collector of transistor 22 to a fixed level. It should be noted that according to other embodiments of this invention either the stripped composite video signal of FIG. 2(*d*) from clipping circuit 64 or the differentiated composite synchronizing signal from differentiating and clipping circuit 82 may be used to control the activation of gate 38 in place of the regenerated horizontal sync pulse signal of FIG. 2(*e*).

I claim:

1. Signal processing apparatus comprising:

differential amplifying means having an input circuit and an output circuit, said differential amplifying means being responsive to application of an input signal to be processed and of a correction signal to its input circuit for producing in its output circuit a difference signal proportional to the difference between the input signal and the correction signal; and a feedback circuit connected between the output and input circuits of said differential amplifying means, said feedback circuit including sampling means for sampling the magnitude of the difference signal in synchronism with the input signal and being responsive to the difference signal for producing a correction signal proportional to the average value of the samples and for supplying this correction signal to the input circuit of said differential amplifying means, whereby portions of the difference signal are maintained at a fixed level in the output circuit of said differential amplifying means.

2. Signal processing apparatus as in claim 1 wherein said feedback circuit further includes:

an amplifier connected to the output circuit of said differential amplifying means and responsive to the difference signal for supplying said sampling means with an amplified difference signal to be sampled; and a filter connected to said sampling means and responsive to the samples taken of the amplified difference signal for supplying the input circuit of said differential amplifying means with the correction signal.

3. Signal processing apparatus as in claim 2 including a signal limiting circuit connected in the output circuit of said differential amplifying means to limit the amplitude of the difference signal.

4. Signal processing apparatus as in claim 3 including a signal divider connected to the input circuit of said differential amplifying means and activated in response to an input signal having an amplitude above a threshold level, whereby the range of difference signals that may be maintained at the fixed level in the output circuit of said differential amplifying means is increased.

5. Signal processing apparatus as in claim 2 including:

a low-pass filter connected to the input circuit of said differential amplifying means to filter the input signal before it is supplied to the differential amplifying means; and a clipping circuit connected to the output circuit of said differential amplifying means to remove an undesired portion of the difference signal.

6. Signal processing apparatus as in claim 5 wherein means including said clipping circuit is connected to said sampling means and is responsive to the difference signal for driving said sampling means in synchronism with the input signal.

7. Signal processing apparatus as in claim 6 wherein said last-mentioned means includes:

a separation circuit connected to said clipping circuit and responsive to the clipped signal therefrom for providing a signal including portions occurring in phase with and at the repetition rate of said portions of the input signal; and a trigger circuit connected to said separation circuit and responsive to at least some of said portions of the signal therefrom for driving said sampling means to sample portions of the amplified difference signal that are supplied to the sampling means in phase with and at the repetition rate of selected ones of said portions of the input signal.

8. Signal processing apparatus as in claim 6 wherein said differential amplifying means comprises:

first and second transistors, each having base, emitter, and collector electrodes; and circuit means connecting said first and second transistors in a differential configuration with the base of said first transistor being connected to receive the input signal and the base of said second transistor being connected to receive the correction signal, said first and second transistors being responsive to the input signal and the correction signal for producing the difference signal at the collector of said first transistor.

9. Signal processing apparatus as in claim 8 wherein:

a unidirectional conducting element is connected between the collectors of said first and second transistors, said unidirectional conducting element being poled to limit the amplitude of the difference signal produced at the collector of said first transistor;

said apparatus includes a signal divider comprising a first resistive element connected for receiving the input signal, another unidirectional conducting element connected to said first resistive element, and a second resistive element connected between said other unidirectional conducting element and a source of reference potential;

the base of said first transistor is connected to a point between said first resistive element and said other unidirectional conducting element;

said apparatus includes circuit means for connecting the base of said second transistor to a point between said second resistive element and said other unidirectional conducting element;

said other unidirectional conducting element is poled to activate said signal divider in response to an input signal having an amplitude above the threshold level of said other unidirectional conducting element;

the amplifier of said feedback circuit has an input circuit connected to the collectors of said first and second transistors and has an output circuit connected to said sampling means;

said sampling means comprises a gate activated in synchronism with the input signal; and the filter of said feedback circuit is connected between said gate and the base of said second transistor.

10. Signal processing apparatus as in claim 1 wherein said differential amplifying means comprises:

first and second transistors, each having base, emitter, and collector electrodes; and circuit means connecting said first and second transistors in a differential configuration with the base of said first transistor being connected to receive the input signal and the base of said second transistor being connected to receive the correction signal, said first and second transistors being responsive to the input signal and the correction signal for producing the difference signal at the collector of said first transistor.

11. Signal processing apparatus as in claim 10 wherein a unidirectional conducting element is connected between the collectors of said first and second transistors, said unidirectional conducting element being poled to limit the amplitude of the difference signal produced at the collector of said first transistor.